United States Patent
Zhang et al.

(10) Patent No.: US 12,289,267 B2
(45) Date of Patent: Apr. 29, 2025

(54) PERIODIC REFERENCE SIGNAL ACTIVATION AND DEACTIVATION

(71) Applicant: Apple Inc., Cupertino, CA (US)

(72) Inventors: Yushu Zhang, Beijing (CN); Qiming Li, Beijing (CN); Haitong Sun, Cupertino, CA (US); Jie Cui, San Jose, CA (US); Huaning Niu, San Jose, CA (US); Chunxuan Ye, San Diego, CA (US); Wei Zeng, Saratoga, CA (US); Dawei Zhang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 649 days.

(21) Appl. No.: 17/437,774

(22) PCT Filed: Mar. 31, 2021

(86) PCT No.: PCT/CN2021/084314
§ 371 (c)(1),
(2) Date: Sep. 9, 2021

(87) PCT Pub. No.: WO2022/205040
PCT Pub. Date: Oct. 6, 2022

(65) Prior Publication Data
US 2022/0360402 A1    Nov. 10, 2022

(51) Int. Cl.
*H04L 5/00* (2006.01)
*H04L 1/00* (2006.01)
*H04W 76/10* (2018.01)
*H04W 76/20* (2018.01)

(52) U.S. Cl.
CPC .......... *H04L 5/0051* (2013.01); *H04L 1/0067* (2013.01); *H04W 76/10* (2018.02); *H04W 76/20* (2018.02)

(58) Field of Classification Search
CPC ... H04L 5/0051; H04L 1/0067; H04L 5/0094; H04W 76/10; H04W 76/20; H04W 24/04; Y02D 30/70
See application file for complete search history.

(56) References Cited

U.S. PATENT DOCUMENTS

2019/0089436 A1\* 3/2019 Wei .......................... H04L 1/16
2019/0215117 A1   7/2019 Lee
(Continued)

FOREIGN PATENT DOCUMENTS

CN    109479204       3/2019
CN    110034897 A     7/2019
(Continued)

OTHER PUBLICATIONS

International Search Report and Written Opinion for PCT/CN2021/084314; Mailed Dec. 29, 2021.
(Continued)

*Primary Examiner* — Abdullahi Ahmed
(74) *Attorney, Agent, or Firm* — Kowert, Hood, Munyon, Rankin & Goetzel, P.C.

(57) ABSTRACT

This disclosure relates to techniques for periodic reference signal activation and deactivation in a wireless communication system. Information configuring periodic reference signals may be received by a wireless device. Information deactivating some or all of the periodic reference signals may be received by the wireless device. The information deactivating some or all of the periodic reference signals may be received using different signaling type than the information configuring the periodic reference signals.

20 Claims, 5 Drawing Sheets

(56) References Cited

U.S. PATENT DOCUMENTS

| | | | | |
|---|---|---|---|---|
| 2019/0394770 A1* | 12/2019 | Wang | ................ | H04W 56/0045 |
| 2020/0028649 A1* | 1/2020 | Zhou | ...................... | H04L 5/0053 |
| 2022/0022192 A1* | 1/2022 | Sakhnini | ............... | H04L 5/0023 |
| 2022/0295509 A1* | 9/2022 | Behravan | .............. | H04L 5/0053 |
| 2022/0361195 A1* | 11/2022 | Sun | ....................... | H04L 5/0057 |
| 2022/0393737 A1* | 12/2022 | Zhang | .................. | H04W 24/08 |
| 2023/0269043 A1* | 8/2023 | Matsumura | ........... | H04L 5/0053 |
| | | | | 370/329 |

FOREIGN PATENT DOCUMENTS

| | | |
|---|---|---|
| CN | 110267329 | 9/2019 |
| CN | 111510267 A | 8/2020 |
| CN | 111566974 | 8/2020 |
| CN | 111817839 A | 10/2020 |
| CN | 112055374 A | 12/2020 |
| CN | 112544047 | 3/2021 |
| WO | 2019157939 A | 8/2019 |
| WO | 2020047080 | 3/2020 |

OTHER PUBLICATIONS

VIVO "Discussion on SRS enhancement"; 3GPP TSG RAN WG1 #103-e R1-2007649; 21 pages; Nov. 13, 2020.
Office Action for CN Patent Application No. 202180005631.0; May 24, 2024.
Notice of Allowance for CN 202180005631.0; Mar. 7, 2025.

\* cited by examiner

PERIODIC REFERENCE SIGNAL ACTIVATION AND DEACTIVATION

PRIORITY CLAIM INFORMATION

This application is a U.S. National Stage application of International Application No. PCT/CN2021/084314, filed Mar. 31, 2021, titled "Periodic Reference Signal Activation and Deactivation", which is hereby incorporated by reference in its entirety.

FIELD

The present application relates to wireless communications, and more particularly to systems, apparatuses, and methods for activating and deactivating periodic reference signals in a wireless communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the Internet, email, text messaging, and navigation using the global positioning system (GPS), and are capable of operating sophisticated applications that utilize these functionalities. Additionally, there exist numerous different wireless communication technologies and standards. Some examples wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus it is very important to also reduce power requirements in UE device designs while allowing the UE device to maintain good transmit and receive abilities for improved communications. Accordingly, improvements in the field are desired.

SUMMARY

Embodiments are presented herein of apparatuses, systems, and methods for activating and deactivating periodic reference signals in a wireless communication system.

According to the techniques described herein, periodic reference signals may be configured by a cellular base station. The periodic reference signals may be configured using radio resource control signaling, at least as one possibility. The periodic reference signals may include any of a variety of types of reference signals, and potentially could include periodic reference signals associated with a cell provided by the cellular base station and/or one or more other cellular base stations.

The cellular base station may subsequently deactivate and/or modify the periodicity of some such periodic reference signals, for example by providing configuration information indicating that certain resources and/or resource sets of the periodic reference signals are to be inactive periodic reference signal resources, or are to be provided at a different periodicity than previously configured. Additionally, it may be possible for the cellular network to reactivate periodic reference signal resources and/or resource sets that have been previously deactivated. Such information may be provided using a different (e.g., more dynamic) signaling mechanism than the information initially configuring the periodic reference signals, such as media access control or downlink control information based signaling.

At least according to some embodiments, such techniques may allow network operators to adapt to different circumstances to deactivate and/or increase the period (i.e., reduce the frequency) of certain reference signal resources to reduce reference signal overhead and potentially use those resources for other purposes when fewer reference signal resources are needed, and/or to activate and/or decrease the period (i.e., increase the frequency) of certain reference signal resources to increase reference signal availability when more reference signal resources are needed.

Note that the techniques described herein may be implemented in and/or used with a number of different types of devices, including but not limited to base stations, access points, cellular phones, portable media players, tablet computers wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
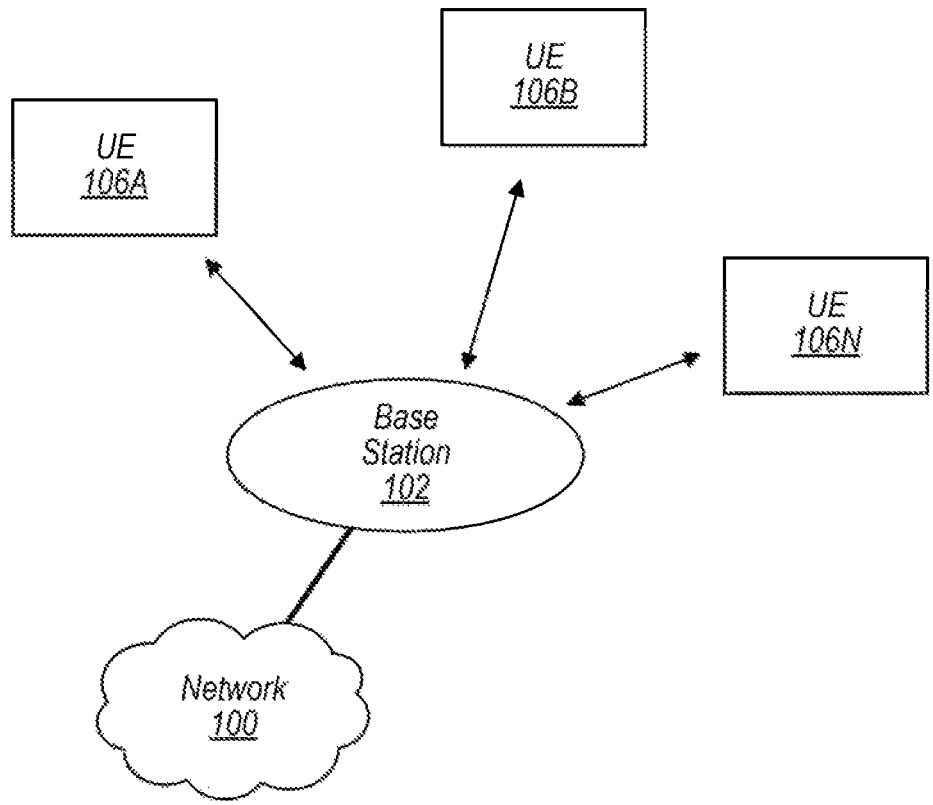
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

UE: User Equipment
RF: Radio Frequency
BS: Base Station
GSM: Global System for Mobile Communication
UMTS: Universal Mobile Telecommunication System
LTE: Long Term Evolution
NR: New Radio
TX: Transmission/Transmit
RX: Reception/Receive
RAT: Radio Access Technology
TRP: Transmission-Reception-Point
DCI: Downlink Control Information
CORESET: Control Resource Set
QCL: Quasi-Co-Located or Quasi-Co-Location
CSI: Channel State Information
CSI-RS: Channel State Information Reference Signals
CSI-IM: Channel State information Interference Measurement
CMR: Channel Measurement Resource
IMR: Interference Measurement Resource
ZP: Zero Power
NZP: Non Zero Power
CQI: Channel Quality Indicator
PMI: Precoding Matrix Indicator
RI: Rank Indicator

Terms

The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the forth and fills in the form without any User input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
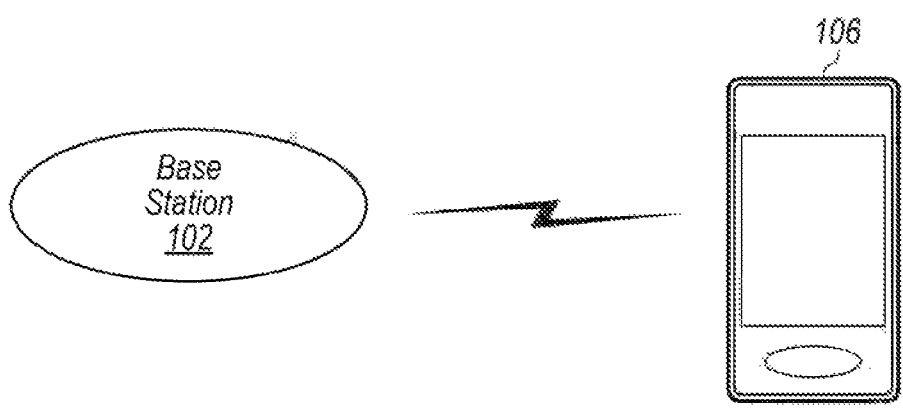
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform techniques for activating and deactivating periodic reference signals in a wireless communication system, such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, an unmanned aerial vehicle (UAV) an unmanned aerial controller (UAC), an automobile, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or to any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share ono or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
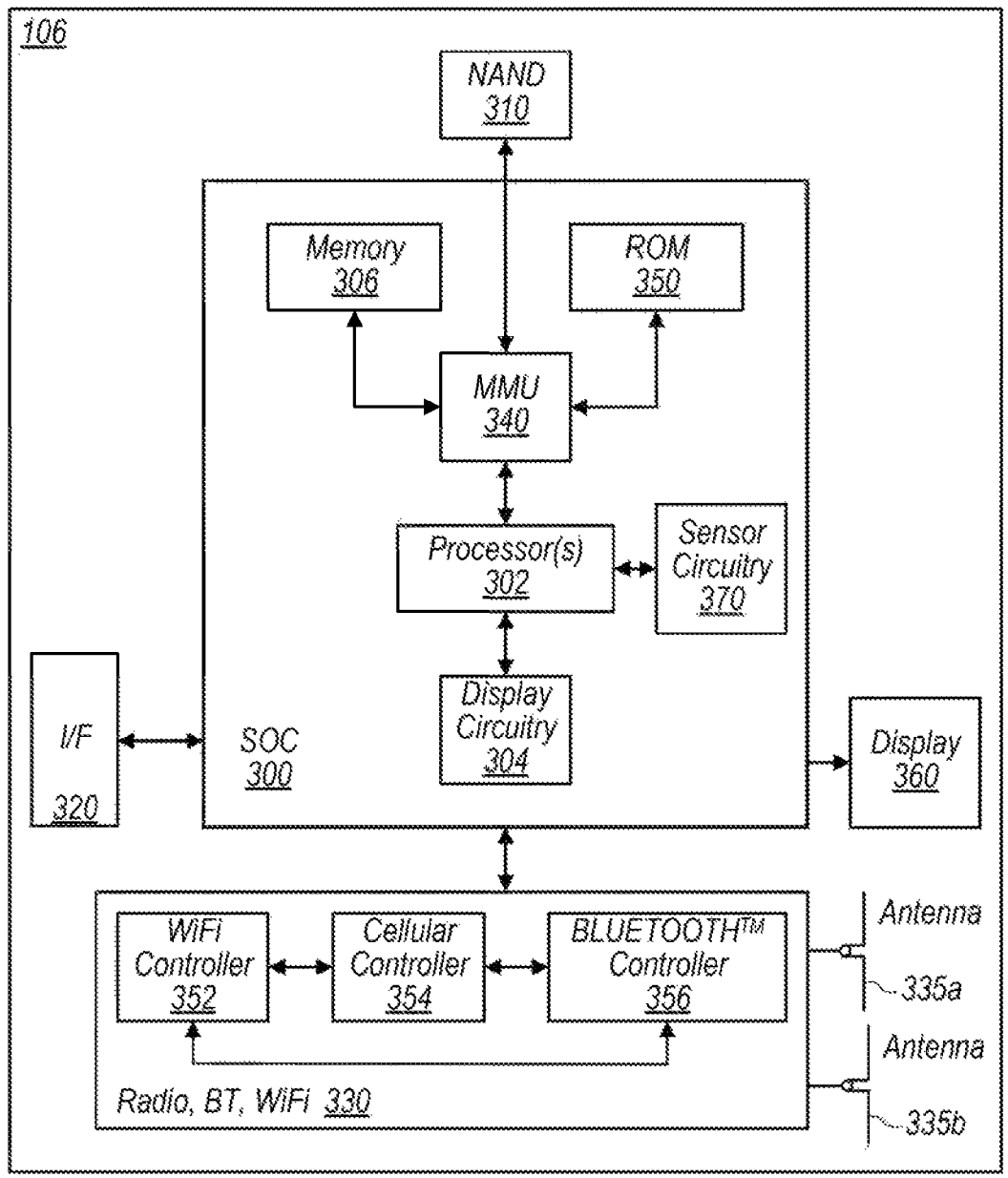
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include sensor circuitry 370, which may include components for sensing or measuring any of a variety of possible characteristics or parameters of the UE 106. For example, the sensor circuitry 370 may include motion sensing circuitry configured to detect motion of the UE 106, for example using a gyroscope, accelerometer, and/or any of various other motion sensing components. As another possibility, the sensor circuitry 370 may include one or more temperature sensing components, for example for measuring the temperature of each of one or more antenna panels and/or other components of the UE 106. Any of various other possible types of sensor circuitry may also or alternatively be included in UE 106 as desired. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335*a*), and possibly multiple antennas (e.g. illustrated by antennas 335*a* and 335*b*), for performing wireless communication with base stations and/or other devices. Antennas 335*a* and 335*b* are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for activating and deactivating periodic reference signals in a wireless communication system, such as described further subsequently herein. The processor(s) 302 of the UE device 106 may be configured to implement part or all of the methods described herein e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform techniques for activating and deactivating periodic reference signals in a wireless communication system according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g. LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
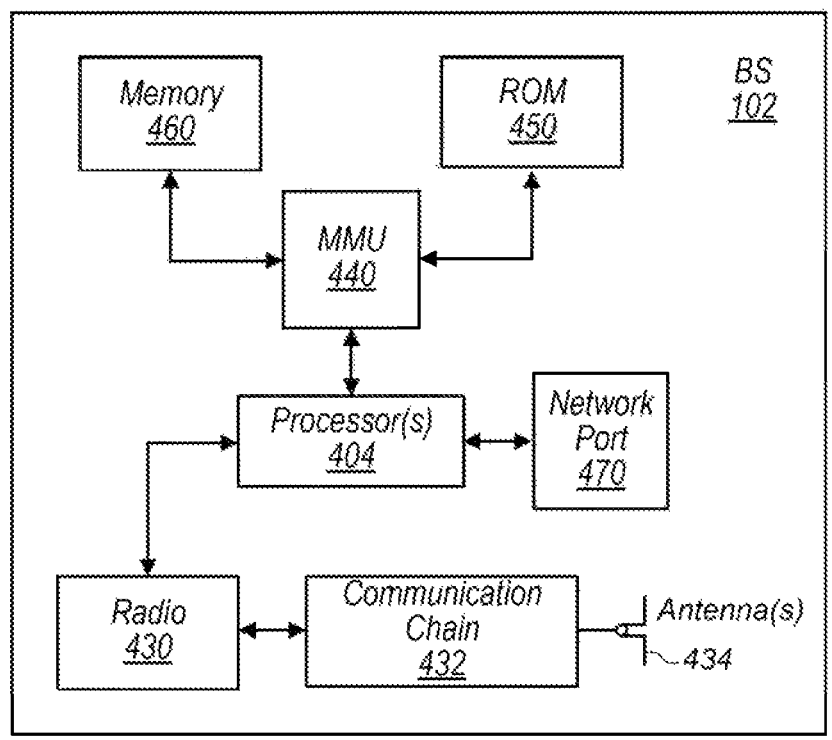
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network(s), e.g., it may include at least one Ethernet port, and radio 430 may be designed to communicate according to the Wi-Fi standard.

Reference Signals

A wireless device such as a user equipment, may be configured to perform a variety of tasks that include the use of reference signals (RS) provided by one or more cellular base stations. For example, initial access and beam measurement by a wireless device may be performed based at least in part on synchronization signal blocks (SSBs) provided by one or more calls provided by one or more cellular base stations within communicative range of the wireless device. Another type of reference signal commonly provided in a cellular communication system may include channel state information (CSI) RS. Various types of CSI-RS may be provided for tracking (e.g., for time and frequency offset tracking), beam management (e.g., with repetition configured, to assist with determining one or more beams to use for uplink and/or downlink communication), and/or channel measurement (e.g., CSI-RS configured in a resource set for measuring the quality of the downlink channel and reporting information related to this quality measurement to the base station), among various possibilities. For example, in the case of CSI-RS for CSI acquisition, the UE may periodically perform channel measurements and send channel state information (CSI) to a BS. The base station can then receive and use this channel state information to determine an adjustment of various parameters during communication with the wireless device. In particular, the BS may use the received channel state information to adjust the coding of its downlink transmissions to improve downlink channel quality.

In many cellular communication systems, the base station may transmit some or all such reference signals (or pilot signals), such as SSB and/or CSI-RS, on a periodic basis. In some instances, aperiodic reference signals (e.g., for aperiodic CSI reporting) may also or alternatively be provided.

As a detailed example, in the 3GPP NR cellular communication standard, the channel gate information fed back from the UE based on CSI-RS for CSI acquisition may include one or more of a channel quality indicator (CQI), a precoding matrix indicator (PMI), a rank indicator (RI), a CSI-RS Resource Indicator (CRI), SSBRI (SS/PBCH Resource Block Indicator, and a Layer Indicator (LI), at least according to some embodiments.

The channel quality information may be provided to the base station for link adaptation, e.g., for providing guidance as to which modulation & coding scheme (MCS) the base station should use when it transmits data. For example, when the downlink channel communication quality between the base station and the UE is determined to be high, the UE may feed back a high CQI value, which may cause the base station to transmit data using a relatively high modulation order and/or a low channel coding rate. As another example, when the downlink channel communication quality between the base station and the UE is determined to be low, the UE may feed back a low CQI value, which may cause the base station to transmit data using a relatively low modulation order and/or a high channel coding rate.

PMI feedback may include preferred precoding matrix information, and may be provided to a base station in order to indicate which MIMO precoding scheme the base station should use. In other words, the UE may measure the quality of a downlink MIMO channel between the base station and the UE, based on a pilot signal received on the channel, and may recommend, through PMI feedback, which MIMO precoding is desired to be applied by the base station. In some cellular systems, the PMI configuration is expressed in matrix form, which provides for linear MIMO precoding. The base station and the UE may share a codebook composed of multiple precoding matrixes, where each MIMO precoding matrix in the codebook may have a unique index. Accordingly, as part of the channel state information fed back by the UE, the PMI may include an index (or possibly multiple indices) corresponding to the most preferred MIMO precoding matrix (or matrixes) in the codebook. This may enable the UE to minimize the amount of feedback information. Thus, the PMI may indicate which precoding matrix from a codebook should be used for transmissions to the UE, at least according to some embodiments.

The rank indicator information (RI feedback) may indicate a number of transmission layers that the UE determines can be supported by the channel, e.g., when the base station and the UE have multiple antennas, which may enable multi-layer transmission through spatial multiplexing. The RI and the PMI may collectively allow the base station to know which precoding needs to be applied to which layer, e.g., depending on the number of transmission layers.

In some cellular systems, a PMI codebook is defined depending on the number of transmission layers. In other words, for R-layer transmission, N number of $N_t \times R$ matrixes may be defined (e.g., where R represents the number of layers, $N_t$ represents the number of transmitter antenna ports, and N represents the size of the codebook). In such a scenario, the number of transmission layers (R) may conform to a rank value of the precoding matrix ($N_t \times R$ matrix), and hence in this context R may be referred to as the "rank indicator (RI)".

Thus, the channel state information may include an allocated rank (e.g., a rank indicator or RI). For example, a MIMO-capable UE communicating with a BS may include four receiver chains, e.g., may include four antennas. The BS may also include four or more antennas to enable MIMO communication (e.g., 4×4 MIMO). Thus, the UE may be capable of receiving up to four (or more) signals (e.g., layers) from the BS concurrently. Layer to antenna mapping may be applied, e.g., each layer may be mapped to any number of antenna ports (e.g., antennas). Each antenna port may send and/or receive information associated with one or more layers. The rank may comprise multiple bits and may indicate the number of signals that the BS may send to the UE in an upcoming time period (e.g., during an upcoming transmission time interval or TTI). For example, an indication of rank 4 may indicate that the BS will send 4 signals to the UE. As one possibility, the RI may be two bits in length (e.g., since two bits are sufficient to distinguish 4 different rank values). Note that other numbers and/or configurations of antennas (e.g., at either or both of the UE or the BS) and/or other numbers of data layers are also possible, according to various embodiments.

Figure 5:
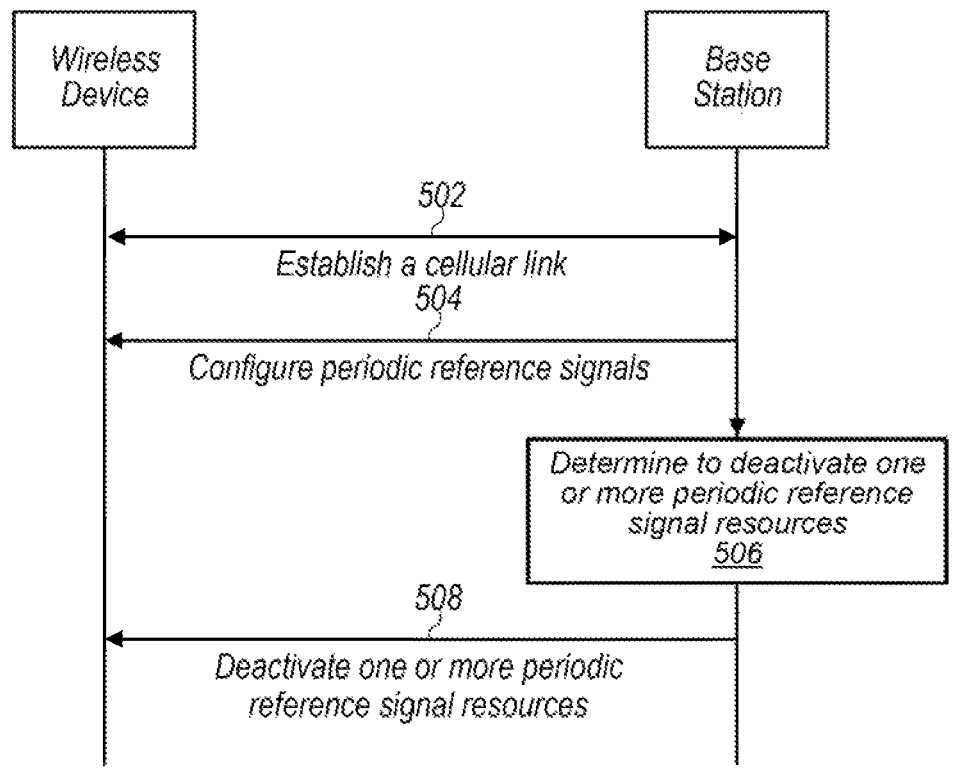
FIG. 5 is a communication flow diagram illustrating aspects of an exemplary possible method for activating and deactivating periodic reference signals in a wireless communication system, according to some embodiments.

FIG. 5—Activating and Deactivating Periodic Reference Signals

While periodic reference signals may be used to support a variety of cellular communication operations with a relatively efficient signaling cost, there may also be instances in which transmitting such periodic reference signals could incur unnecessary power consumption and transmission overhead, e.g., if there are no wireless devices to make use of certain time and frequency resources allocated to periodic reference signals.

Thus, it may be beneficial to specify techniques for supporting dynamic activation and deactivation of periodic reference signals, e.g., to provide the potential for decreasing power consumption and/or increasing network resource use efficiency. To illustrate one such set of possible techniques, FIG. 5 is a communication flow diagram illustrating a method for activating and deactivating periodic reference signals in a wireless communication system, at least according to some embodiments.

Aspects of the method of FIG. 5 may be implemented by a wireless device, e.g., in conjunction with one or more cellular base stations, such as a UE 106 and a BS 102 illustrated in and described with respect to various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

Note that while at least some elements of the method of FIG. 5 are described in a manner relating to the use of communication techniques and/or features associated with 3GPP and/or NR specification documents, such description is not intended to be limiting to the disclosure, and aspects of the method of FIG. 5 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

In 502, the wireless device may establish a wireless link with a cellular base station. According to some embodiments, the wireless link may include: a cellular link according to 5G NR. For example, the wireless device may establish a session with an AMF entity of the cellular network by way of one or more gNBs that provide radio access to the cellular network. As another possibility, the wireless link may include a cellular link according to LTE. For example, the wireless device may establish a session with a mobility management entity of the cellular network by way of an eNB that provides radio access to the cellular network. Other types of cellular links are also possible, and the cellular network may also or alternatively operate according to another cellular communication technology (e.g., UMTS, CDMA2000, GSM, etc.), according to various embodiments.

Establishing the wireless link may include establishing RRC connection with a serving cellular base station, at least according to some embodiments. Establishing the first RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in a RRC connected state. In some instances, the RRC connection may also be released (e.g., after a certain period of inactivity with respect to data communication), in which case the wireless device may operate in a RRC idle state or a RRC inactive state. In some instances, the wireless device may perform handover (e.g., while in RRC connected mode) or cell re-selection (e.g., while in RRC idle or RRC inactive mode) to a new serving cell, e.g., due to wireless device mobility, changing wireless medium conditions, and/or for any of various other possible reasons.

At least according to some embodiments, the wireless device may establish multiple wireless links, e.g., with multiple TRPs of the cellular network, according to a multi-TRP configuration. In such a scenario, the wireless device my be configured (e.g., via RRC signaling) with one or more transmission control indicators (TCIs), e.g., which may correspond to various beams that can be used to communicate with the TRPs. Further, it may be the case that one or more configured TCI states may be activated by media access control (MAC) control element (CE) for the wireless device at a particular time.

At least in same instances, establishing the wireless link(s) may include the wireless device providing capability information for the wireless device. Such capability information may include information relating to any of a variety of types of wireless device capabilities.

In 504, the wireless device may receive ("first") information configuring periodic reference signals, e.g., from a cellular base station that provides a serving cell to the wireless device. At least according to some embodiments, the information configuring the periodic reference signals may include radio resource control signaling provided by the serving cell of the wireless device. The periodic reference signals may include any of a variety of possible types of reference signals. For example, the periodic reference signals may include any or all of synchronization signal blocks (SSBs), channel state information (CSI) reference signals (RS) for tracking, CSI-RS for beam management (BM), CSI-RS for CSI acquisition, or CSI for interference management (IM), among various possibilities. The periodic reference signals may be configured for any of various operating modes, such as single cell operation or inter-cell multi-cell operation, among, various possibilities. Multiple periodic reference signals for some or all such types of periodic reference signals may be configured, potentially including reference signals for any or all of a primary (e.g., serving) cell or one or more secondary (e.g., assistant) cells, and or reference signals in any or all of the same bandwidth part (BWP) used to convey the configuration information or one or more different BWPs, at least according to some embodiments.

Configuring the periodic reference signals may include configuring on which time and/or frequency resource(s) the periodic reference signals occur, at what periodicity the periodic reference signals occur, a slot offset at which the periodic reference signals occur, and/or any of various other aspects or parameters for any or all of the periodic reference signals configured by the cellular base station, according to various embodiments.

Note that the wireless device may also receive information indicating to use certain selected reference signal resources among the configured periodic reference signals configured by the cellular base station. For example, it may be the case that one or more CSI-RS for tracking (which may also be referred to as "TRS") resources to use can be indicated to the wireless device, e.g., using a TCI state indication in MAC CE signaling.

In 506, the cellular base station may determine to deactivate or modify the periodicity of one or more periodic reference signal resources. The cellular base station may determine to deactivate or modify the periodicity of the one or more periodic reference signal resources for any of a variety of possible reasons. As one possibility, the resource(s) selected may include one or more resources that are not currently being used by any wireless devices served by the cellular base station. Alternatively, the resource(s) selected may include one or more resources that are being used or are possibly being used but by relatively few wireless devices (e.g., use of those resources may be below a certain configured or predefined threshold). Numerous other reasons for determining to deactivate or modify periodicity of certain periodic reference signal resources are also possible.

In 508, the wireless device may receive ("second") information deactivating or modifying the periodicity of one or more periodic reference signal resources. At least according to some embodiments, the information deactivating or modifying the periodicity of the one or more periodic reference signal resources may include MAC CE or DCI signaling provided by the serving cell of the wireless device. In other words, at least according to some embodiments, the information deactivating or modifying the periodicity of the one or more periodic reference signal resources may be provided using a different type of control signaling than the information configuring the periodic reference signals. At least in some instances, for example, use of a more dynamic signaling mechanism with lower overhead and/or time to take effect (such as MAC CE or DCI signaling, e.g., in comparison to RRC signaling) to provide such information may help support more dynamic activation/deactivation/periodicity modification in response to changing conditions that may impact the relative value of using configured periodic reference signal resources for those periodic reference signals or for other purposes.

According to some embodiments, the information may include a binary activation/deactivation indication for the affected periodic reference signal resource(s). As another possibility, the information may include an indication of an updated periodicity, where a "no transmission" or 0 periodicity indication is configured or specified as a possible periodicity option to effectively deactivate or set to inactive the affected periodic reference signal resource(s), e.g., among various other possible configured or specified periodicity options. Other frameworks for indicating activation/deactivation/periodicity modification for periodic reference signal resources are also possible.

Note that at least according to some embodiments, it may be the case that the wireless device by default assumes that all periodic reference signals configured in the first configuration information are active. Additionally, or alternatively, for certain configured periodic reference signals, such as those configured in an active TCI state or spatial relation, or used for pathless measurement, or beam failure, detection, or radio link monitoring, it may be the case that the wireless device assumes those periodic reference signals are active.

Note that the second information may deactivate or modify the periodicity of one or more periodic reference signal resources of any or all of a variety of types of reference signals, such as SSBs, TRS, CSI-RS for BM, CSI-RS for CSI acquisition, CSI-IM, etc. The deactivation or periodicity modification may apply at a resource level or a resource set level for any or all of the affected periodic reference signal resources. The deactivation or periodicity modification may apply to reference signals associated with any or all of the cell from which the second information is received or a different cell than the cell from which the second information is received. The deactivation or periodicity modification may apply to reference signals associated with any or all of a BWP on which the second information is received or a different BWP than the BWP on which the second information is received. In some instances, such as in a scenario in which the second information modifies the periodicity of a periodic reference signal, the second information may update a slot offset of the periodic reference signal.

The periodic reference signal resources that are indicated to be inactive by the cellular base station may be used by a cellular base station for one or more other purposes, such as for a physical downlink control channel (PDCCH) transmission or a physical downlink shared channel (PDSCH) transmission. Thus, it may be possible for those resources to be used to increase spectral efficiency when they are not needed for use as reference signals, at least according to some embodiments.

Note that the wireless device may consider whether various configured periodic reference signals resources are active or inactive when performing rate matching for downlink channels from a TRP associated with those periodic reference signals resources, at least according to some embodiments. For example, for such rate matching, the wireless device may determine that active periodic reference signal resources of the TRP are considered as not available for the rate matching, and that inactive periodic reference signal resources of the TRP are considered as available for the rate matching.

In some instances, it may be the case that the wireless device may determine a resource indicator to use for channel measurement reporting based at least in part on which periodic reference signals resources are active and/or which periodic reference signals resources are inactive. For example, when performing channel measurements using active periodic reference signals configured for channel measurement, it may be the case that inactive periodic reference signals configured for channel measurement are not considered when determining the resource indicator (e.g., CSI resource indicator (CRI) or SSB resource indicator (SSBRI) to use for the channel measurement reporting.

In some instances, the wireless device may transmit an acknowledgement in response to the second information. For example, this may include, a hybrid automatic repeat request (HARQ) acknowledgement (ACK) provided in response to MAC CE signaling or DCI signaling. In the case of DCI signaling, the wireless device may be able to determine a bit position for the HARQ ACK in accordance with a virtual PDSCH slot that is predefined or indicated, or the total/counter downlink assignment index (DAI) may be indicated by the DCI to facilitate the wireless device being able to determine a bit position for the HARQ ACK. Alternatively, it may be the case that the wireless device does not transmit an acknowledgement in response to the second information; for example, it may be specified that no HARQ ACK is needed for such DCI based second information, in some embodiments.

The cellular base station may provide Anther information deactivating, modifying the periodicity of, or reactivating one or more (same or different) periodic reference signal resources in a similar manner any number of times, e.g., in response to changing conditions in the wireless communication system. For example, if a wireless device enters the system (e.g., due to mobility, being powered on, etc.) and a periodic reference signal resource that has been deactivated the cellular base station determines that a currently inactive periodic reference signal resource would benefit the wireless device, the cellular base station may reactivate the periodic reference signal resource. Similarly, the periodicity of certain periodic reference signal resources could be modified in response to the number and distribution of wireless devices within communication range of a cellular base station, for example such that those per reference signal resources are provided more frequently when more wireless devices are present and positioned to benefit from those periodic reference signal resources and less frequently when fewer wireless devices are present and positioned to benefit from those periodic reference signal resources, at least as one possibility. Other approaches to determining how and when to activate, deactivate, or modify the periodicity of periodic reference signals are also possible.

Thus, at least according to some embodiments, the method of FIG. 5 may be used to provide a framework according to which periodic reference signals can be dynamically activated and deactivated, which may in turn increase the cellular network resource use efficiency and/or reduce network power consumption, potentially with little or no negative impact to wireless device performance, at least in some instances.

Figure 6:
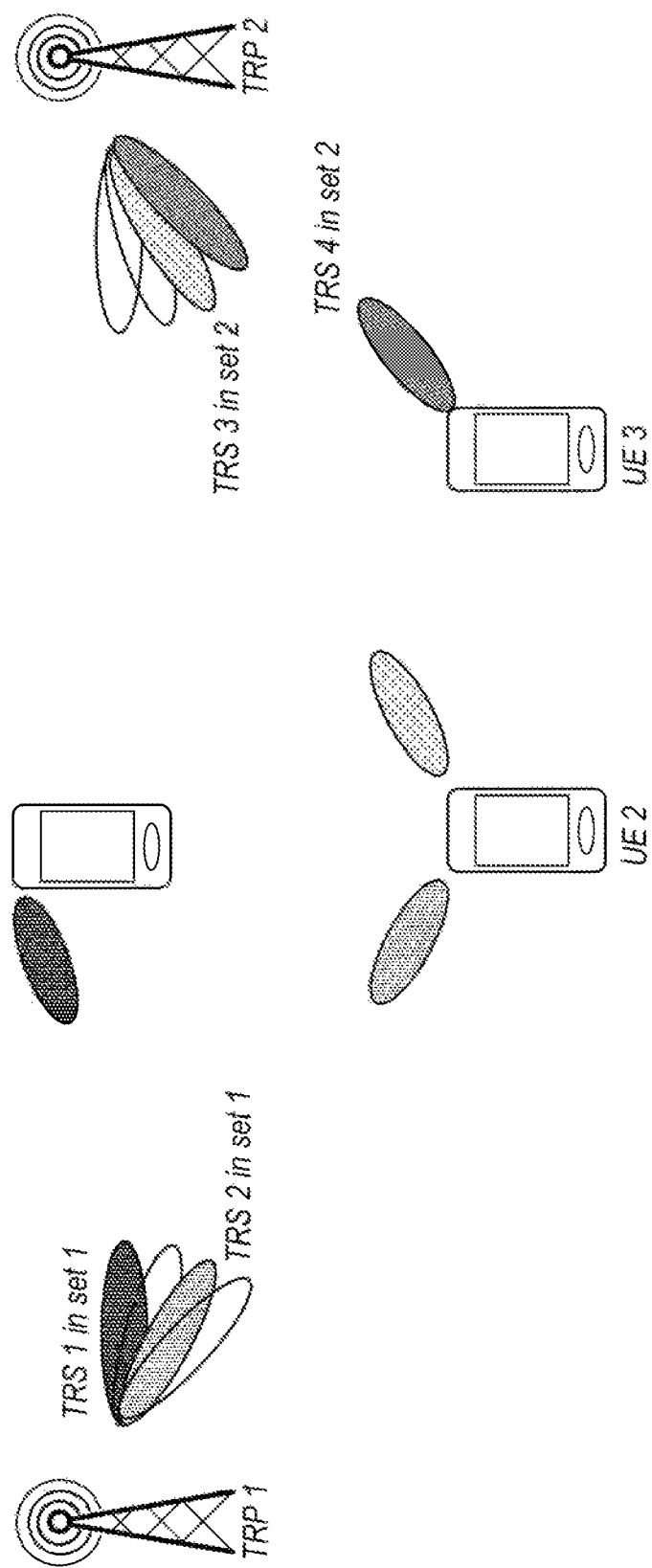
FIGS. 6-7 illustrate exemplary aspects of various possible scenarios in which periodic reference signal activation or deactivation could be performed, according to some embodiments.
Figure 7:
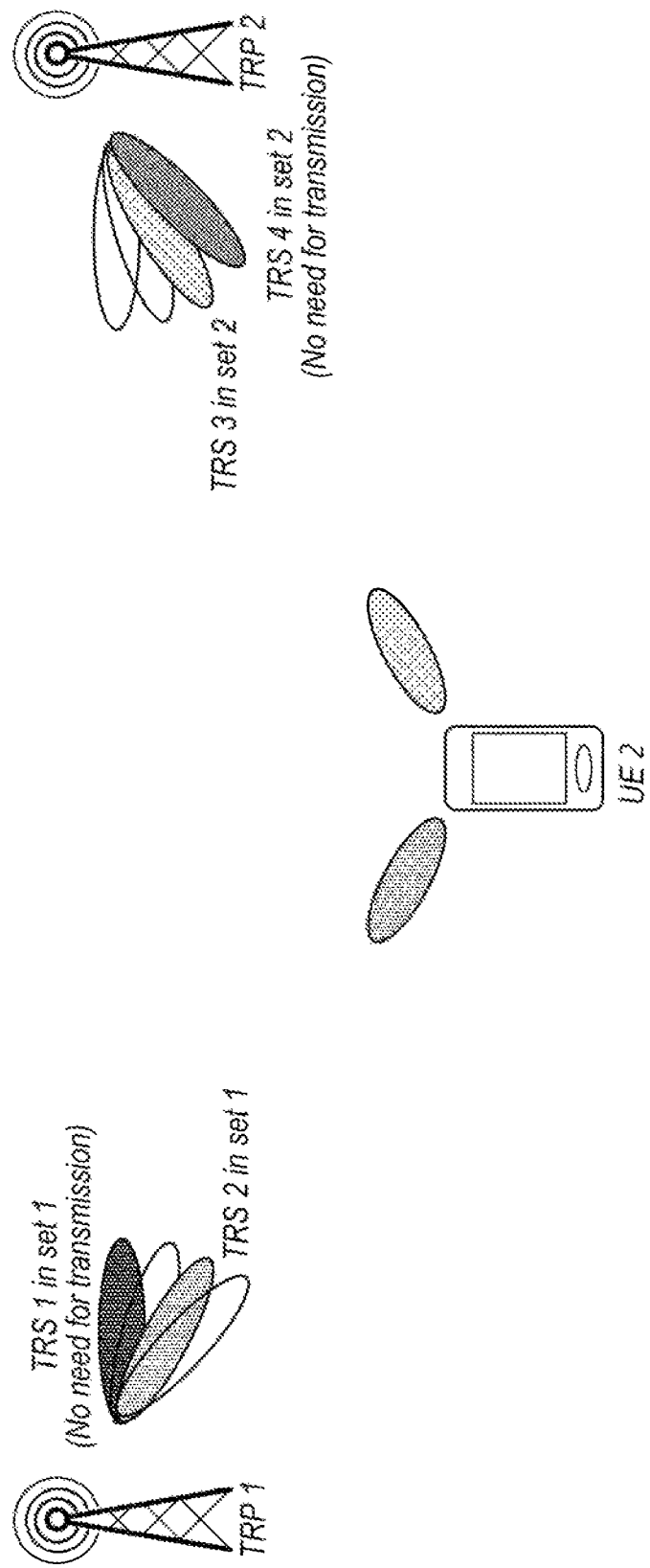

FIGS. 6-7 and Additional Information

FIGS. 6-7 illustrate further aspects that might be used in conjunction with the method of FIG. 5 if desired. It should be noted, however, that the exemplary details illustrated in and described with respect to FIGS. 6-7 are not intended to be limiting to the disclosure as a whole: numerous variations and alternatives to the details provided herein below are possible and should be considered within the scope of the disclosure.

In 3GPP Release 15, periodic reference signals can be supported for several different kinds of functionality. For example, synchronization signal blocks (SSBs) may be used for initial access and beam management, channel state information (CSI) reference signals (RS) for tracking (or "TRS") may be configured in a resource set with TRS-Info configured and may be used for time and frequency offset tracking, CSI-RS for beam management (BM) may be configured in a resource set with repetition configured and may be used for stream measurement, and/or CSI-RS for CSI acquisition may be configured in a resource set without repetition and without TRS-Info and may be used for CSI measurement, at least according to some embodiments. Such periodic RS may be configured by RRC signaling. In some instances, periodic RS from all network beams for a UE may be configured, e.g., to avoid overly frequent RRC reconfiguration, for example since RRC signaling may commonly have a relatively high overhead and delay compared to other types of signaling that can be used in cellular communication, such as media access control (MAC) control elements (CEs) or downlink control information (DCI). It may be the case that a UE can be configured with periodic RS from multiple cells (e.g., serving/primary cell and assistant/secondary cell), e.g., in inter-cell multi-TRP operation.

FIG. 6 illustrates an example wireless communication system in which periodic reference signals could be configured for several UEs. As shown, there may be 3 UEs and 2 TRPs in the system, with 4 periodic TRS configured in the resource set for each TRP. For UE 1, TRS 1 (in set 1) is configured in its TCI state, for UE 2, TRS 2 (in set 1) and TRS 3 (in set 2) are configured in its TCI states, and for UE 3, TRS 4 (in set 2) is configured in its TCI state. For the 4 periodic TRS, it may be the case that the UEs assume those resource elements are "not available" for rate matching, e.g., at least for PDCCH/PDSCH in the same TRP. A gNB may be able to use MAC CE signaling to select another TCI (e.g., with a different TRS) for a UE to update its beam.

In some scenarios, it may be the case that there is no UE in a given direction, in which case to keep transmitting periodic RS in that direction could result in a waste of network power consumption and overhead. For example, it may be the case that such resources are not being used as RS by any UEs and also cannot be used for PDCCH/PDSCH transmission. FIG. 7 illustrates such an example wireless communication in which periodic reference signals could be configured. As shown, in this scenario, similar to the scenario of FIG. 6, TRPs 1 and 2 may be configured with 4 periodic TRS, and UE 2 may be configured with TRS 2 (in set 1) and TRS 3 (in set 2). However, no UEs may be present that are configured with TRS 1 or TRS 4, such that there may be no need to transmit TRS 1 or TRS 4. Accordingly, there may be some benefit to supporting dynamic activation and deactivation of at least some types of periodic reference signals, e.g., to be able to free such unused resources to reduce network power consumption and/or to increase resources available for other uses, and techniques for maintaining a consistent understanding between a gNB and a UE regarding when a periodic RS is activated or deactivated on certain resources or resource sets may be helpful for supporting such dynamic activation and deactivation.

As one approach for providing control signaling for dynamic activation/deactivation of periodic RS, a MAC CE could be introduced for dynamic activation/deactivation for periodic CSI-RS/SSB. At least according to some embodiments, the MAC CE may indicate the active/inactive status for a periodic CSI-RS at a resource level and/or at a resource set level. The MAC CE may indicate the active/inactive status for a periodic RS in the same serving cell or a different serving cell or multiple serving cells. The MAC CE may indicate the active inactive status for periodic RS in the same bandwidth part (BWP) or a different BWP or multiple BWPs. It may be the case that UEs are configured to assume all the periodic CSI-RS/SSB configured by RRC should be active by default. Additionally, for a periodic RS configured in the active TCI state or spatial relation or used for pathloss measurement or beam failure detection or radio link monitoring, it may be the case that a UE is configured to assume that the periodic RS should be active.

As another possible approach for providing control signaling for dynamic activation/deactivation of periodic RS, a MAC CE could be introduced for updating the periodicity for periodic CSI-RS/SSB, e.g., where one possible periodicity state can indicate "no transmission". For a periodic RS configured in the active TCI state or spatial relation or used for pathloss measurement or beam failure detection or radio link monitoring, it may be the case that a UE is configured to assume that the periodic RS should not be configured with periodicity set to "no transmission". At least according to some embodiments, the MAC CE may update the periodicity for a periodic CSI-RS at a resource level and/or at a resource set level. The MAC CE may update the periodicity for a periodic RS in the same serving cell or a different serving cell or multiple serving cells. The MAC CE may update the periodicity for periodic RS in the same bandwidth part (BWP) or a different BWP or multiple BWPs. It may be possible for the MAC CE to update the slot offset for CSI-RS in addition to the periodicity, at least in some instances.

As a still further possible approach, a dedicated DCI format can be introduced for dynamic activation/deactivation for periodic CSI-RS/SB. The DCI may be associated with a new radio network temporary identifier (RNTI), e.g., with a corresponding cyclic redundancy check (CRC) sequence for the PDCCH that is based on the new RNTI. It may be possible that the same RNTI value may be predefined or configured for multiple UEs e.g., to support group-cast activation/deactivation. At least according to some embodiments, the DCI may indicate the active/inactive status for a periodic CSI-RS at a resource level and/or at a resource set level. The DCI may indicate the active/inactive status for a periodic RS in the same serving cell or a different serving cell or multiple serving cells. The DCI may indicate the active/inactive status for periodic RS in the same bandwidth part (BWP) or a different BWP or multiple BWPs. It may be the case that UEs are configured to assume all the periodic CSI-RS/SSB configured by RRC should be active by default. Additionally, for a periodic RS configured in the active TCI state or spatial relation or used for pathloss measurement or beam failure detection or radio link monitoring, it may be the case that a UE is configured to assume that the periodic RS should be active.

As yet another possible approach, a dedicated DCI format can be introduced to update the periodicity for periodic CSI-RS/SB, e.g., where one possible periodicity state can indicate "no transmission". The DCI may be associated with a new RNTI, e.g., with a corresponding CRC sequence for the PDCCH that is based on the new RNTI. It may be possible that the same RNTI value may be predefined or configured for multiple UEs, e.g., to support group-cast periodicity updates. At least according to some embodiments, the DCI may indicate the active/inactive status for a periodic CSI-RS at a resource level and/or at a resource set level. The DCI may indicate the active/inactive status for a periodic RS in the same serving cell or a different serving cell or multiple serving cells. The DCI may indicate the active/inactive status for periodic RS in the same bandwidth part (BWP) or a different BWP or multiple BWPs. It may be possible for the DCI to update the slot offset for CSI-RS in addition to the periodicity, at least in some instances.

While for MAC CE based signaling approaches, it may be possible to use existing acknowledgement (ACK) schemes to support UE acknowledgement of the new MAC CE, for DCI based signaling approaches, it may be useful to introduce a hybrid automatic repeat request (HARQ) ACK for the DCI. As one such possibility for a type 1 codebook, a virtual PDSCH slot can be predefined or indicated so that the UE can determine the bit order for the HARQ bit position for the DCI. As another possibility, for a type 2 codebook, the total/counter Downlink Assignment Index (DAI) may be indicated by the DCI to facilitate the UE determining the HARQ bit position for the DCI. It may be the case that the action delay (e.g., the length of time (e.g., in number of symbols) until the instructions indicated in the DCI are implemented by the UE and the network) is counted starting from the HARQ-ACK for the DCI. Alternatively, it may be possible that no HARQ-ACK is needed for the DCI. In such a scenario, it may be the case that the action delay is counted starting from the last symbol of the DCI. The action delay can be predefined or configured by higher layer signaling.

At least according to some embodiments, any of the MAC CE or DCI based approaches to activating/deactivating periodic RS and/or updating the periodicity of periodic RS may be applicable for one of or a subset of or all of the following types of periodic RS: SSB; CSI-RS for tracking (TRS); CSI-RS for BM; CSI-RS for CSI acquisition; and/or CSI for interference measurement (CSI-IM).

For rate matching for PDCCH/PDSCH at least from the same TRP as periodic RS configured by RRC, it may be the case that a UE can consider the resource elements used for active periodic CSI-RS and the resource blocks used for active SSB as "not available", and also that a UE can consider the resource elements used for inactive periodic CSI-RS and the resource blocks used for inactive SSB as "available".

For CSI/L1-RSRP/L1-SINR reporting based on periodic RS, it may be the case that a UE is configured to only consider the active periodic RS for CSI-RS resource indicator (CRI) or SSB resource indicator (SSBRI) reporting. For example, if a CSI report is configured (e.g., using RRC signaling) for CSI-RS resources {1, 2, 3, 4}, wherein {1, 3} are configured as inactive (e.g., using MAC CE or DCI), it may be the case that the reported CRT contains 1 bit where value 0 indicates CSI-RS resource 2 and value 1 indicates CSI-RS resource 4. It may be the case that inactive periodic RS should not occupy a CSI processing unit (CPU) when calculating the UE complexity. It may also or alternatively be the case that inactive periodic RS should not be taken into account for the CSI-L1-RSRP/L1-SINR reported UE capability, e.g., UE capability of maximum number of resources for beam measurement.

At least in some instances, when determining the UE behavior for quasi-co-location (QCL) typeD collision handling, it may be the case that only the active periodic RS are considered, and that the QCL-TypeD for inactive periodic RS should not be considered. Thus, as an example, when PDCCH collides with a periodic CSI-RS, it may be defined that they should be based on the same QCL-TypeD. However, if the periodic CSI-RS is deactivated it may be acceptable for the PDCCH QCL-TypeD to be different from that of the inactive CSI-RS.

For CSI/L1-SINR measurement based on a channel measurement resource (CMR) and an interference measurement resource (IMR), it may be the case that the same activation/inactivation status should be configured for each CMR-IMR, pair, at least according to some embodiments.

In the following further exemplary embodiments are provided.

One set of embodiments may include an apparatus, comprising: a processor configured to cause a wireless device to: establish a wireless link with a cellular base station; receive first information, wherein the first information configures one or more periodic reference signals; and receive second information, wherein the second information updates a periodicity of one or more reference signal resources of the one or more periodic reference signals, wherein the second information is received using a different type of signaling than the first information.

According to some embodiments, the second information updates the periodicity of the one or more reference signal resources to be inactive.

According to some embodiments, the processor is further configured to cause the wireless device to: perform rate matching for one or more downlink channels from a transmission-reception-point (TRP), wherein for the rate matching: active periodic reference signal resources of the TRP are considered as not available, and inactive periodic reference signal resources of the TRP are considered as available.

According to some embodiments, the processor is further configured to cause the wireless device to: perform one or more channel measurements using active periodic reference signals configured for channel measurement; and determine a resource indicator to use for channel measurement reporting based on the one or more channel measurements, wherein inactive periodic reference signals configured for channel measurement are not considered when determining the resource indicator to use for the channel measurement reporting.

According to some embodiments, the second information updates the periodicity of the one or more reference signal resources at one or more of a resource level or a resource set level, wherein the one or more reference signal resources for which the second information updates the periodicity are associated with one or more of a cell from which the second information is received or a different cell than the cell from which the second information is received, wherein the one or more reference signal resources for which the second information updates the periodicity are associated with one or more of a bandwidth part (BWP) on which the second information is received or a different BWP than the BWP on which the second information is received.

According to some embodiments, the periodic reference signals for which the second information updates the periodicity include one or more of synchronization signal blocks (SSB); channel state information (CSI) reference signals (RS) for tracking; CSI-RS for beam management; CSI-RS for CSI acquisition; or CSI for interference management (IM).

According to some embodiments, the second information updates a slot offset of one or more periodic reference signals.

Another set of embodiments may include a method, comprising: by a wireless device: establishing a wireless link with a cellular base station; receiving first configuration information, wherein the first configuration information configures one or more periodic reference signals, wherein the first configuration information is received using radio resource control (RRC) signaling; and receiving second configuration information, wherein the second configuration information deactivates at least a subset of the one or more periodic reference signals, wherein the second configuration information is received using a signaling type other than RRC signaling.

According to some embodiments, the second configuration information deactivates periodic reference signals at one or more of a resource level or a resource set level.

According to some embodiments, the second configuration information deactivates periodic reference signals associated with one or more of: a cell from which the second configuration information is received; or a different cell than the cell from which the second configuration information is received.

According to some embodiments, the second configuration information deactivates periodic reference signals associated with one or more of: a bandwidth part (BWP) on which the second configuration information is received; or a different BWP than the BWP on which the second configuration information is received.

According to some embodiments, the second configuration information is received using a media access control (MAC) control element (CE).

According to some embodiments, the second configuration information is received using downlink control information (DCI).

According to some embodiments, the method further comprises: transmitting an acknowledgement in response to the second configuration information.

Yet another set of embodiments may include a cellular base station, comprising: an antenna; a radio operably coupled to the antenna; and a processor operably coupled to the radio; wherein the cellular base station is configured to: transmit first configuration information, wherein the first configuration information configures a periodic reference signal using one or more resources; determine to deactivate the periodic reference signal on at least one resource of the one or more resources; and transmit second configuration information, wherein the second configuration information indicates that the periodic reference signal is deactivated on the at least one resource.

According to some embodiments, the first configuration information is provided in a radio resource control (RRC) message, wherein the second configuration information is provided in one of a media access control (MAC) control element (CE) or downlink control information (DCI).

According to some embodiments, the cellular base station is further configured to: transmit third configuration information, wherein the third configuration information indicates that the periodic reference signal is reactivated on the at least one resource.

According to some embodiments, the first configuration information configures a plurality of periodic reference signals using a plurality of resources; wherein the cellular base station is further configured to determine to deactivate multiple periodic reference signals on multiple resources;

wherein the second configuration information indicates that the multiple periodic reference signals are deactivated on the multiple resources.

According to some embodiments, the second configuration information updates a periodicity of the periodic reference signal on the at least one resource to deactivate the periodic reference signal on the at least one resource.

According to some embodiments, the cellular base station is further configured to: perform a non reference signal transmission using one or more deactivated periodic reference signal resources.

A further exemplary embodiment may include a method, comprising: performing, by a device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE a message/signal received by the base station.

Embodiments of the present disclosure may be realized in any of various forms. For example, in some embodiments, the present subject matter may be realized as a computer-implemented method, a compute readable memory medium, or a computer system. In other embodiments, the present subject matter may be realized using one or more custom-designed hardware devices such as ASICs. In other embodiments, the present subject matter may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus, comprising:
a processor configured to cause a wireless device to:
establish a wireless link with a cellular base station;
receive first information, wherein the first information configures one or more periodic reference signals; and
receive second information, wherein the second information updates a periodicity of one or more reference signal resources of the one or more periodic reference signals,
wherein the second information is received using a different type of signaling than the first information.

2. The apparatus of claim 1,
wherein the second information updates the periodicity of the one or more reference signal resources to be inactive.

3. The apparatus of claim 2, wherein the processor is further configured to cause the wireless device to:
perform rate matching for one or more downlink channels from a transmission-reception-point (TRP), wherein for the rate matching:
active periodic reference signal resources of the TRP are considered as not available, and
inactive periodic reference signal resources of the TRP are considered as available.

4. The apparatus of claim 2, wherein the processor is further configured to cause the wireless device to:
perform one or more channel measurements using active periodic reference signals configured for channel measurement; and
determine a resource indicator to use for channel measurement reporting based on the one or more channel measurements, wherein inactive periodic reference signals configured for channel measurement are not considered when determining the resource indicator to use for the channel measurement reporting.

5. The apparatus of claim 1,
wherein the second information updates the periodicity of the one or more reference signal resources at one or more of a resource level or a resource set level,
wherein the one or more reference signal resources for which the second information updates the periodicity are associated with one or more of a cell from which the second information is received or a different cell than the cell from which the second information is received, wherein the one or more reference signal resources for which the second information updates the periodicity are associated with one or more of a bandwidth part (BWP) on which the second information is received or a different BWP than the BWP on which the second information is received.

6. The apparatus of claim 1, wherein the periodic reference signals for which the second information updates the periodicity include one or more of:
synchronization signal blocks (SSBs);
channel state information (CSI) reference signals (RS) for tracking;
CSI-RS for beam management;
CSI-RS for CSI acquisition; or
CSI for interference management (IM).

7. The apparatus of claim 1,
wherein the second information updates a slot offset of one or more periodic reference signals.

8. A method, comprising:
by a wireless device:
establishing a wireless link with a cellular base station;
receiving first configuration information, wherein the first configuration information configures one or more periodic reference signals, wherein the first configuration information is received using radio resource control (RRC) signaling; and
receiving second configuration information, wherein the second configuration information activates or deactivates at least a subset of the one or more periodic reference signals, wherein the second configuration information is received using a signaling type other than RRC signaling.

9. The method of claim 8,
wherein the second configuration information activates or deactivates periodic reference signals at one or more of a resource level or a resource set level.

10. The method of claim 8, wherein the second configuration information activates or deactivates periodic reference signals associated with one or more of:
a cell from which the second configuration information is received; or
a different cell than the cell from which the second configuration information is received.

11. The method of claim 8, wherein the second configuration information activates or deactivates periodic reference signals associated with one or more of:
a bandwidth part (BWP) on which the second configuration information is received; or
a different BWP than the BWP on which the second configuration information is received.

12. The method of claim 8,
wherein the second configuration information is received using a media access control (MAC) control element (CE).

13. The method of claim 8,
wherein the second configuration information is received using downlink control information (DCI).

14. The method of claim 8, wherein the method further comprises:
transmitting an acknowledgement in response to the second configuration information.

15. A cellular base station, comprising:
an antenna;
a radio operably coupled to the antenna; and
a processor operably coupled to the radio;
wherein the cellular base station is configured to:
transmit first configuration information, wherein the first configuration information configures a periodic reference signal using one or more resources;
determine to activate or deactivate the periodic reference signal on at least one resource of the one or more resources; and
transmit second configuration information, wherein the second configuration information indicates that the periodic reference signal is activated or deactivated on the at least one resource.

16. The cellular base station of claim 15,
wherein the first configuration information is provided in a radio resource control (RRC) message,
wherein the second configuration information is provided in one of a media access control (MAC) control element (CE) or downlink control information (DCI).

17. The cellular base station of claim 15, wherein the cellular base station is further configured to:
transmit third configuration information, wherein the third configuration information indicates that the periodic reference signal is reactivated on the at least one resource.

18. The cellular base station of claim 15,
wherein the first configuration information configures a plurality of periodic reference signals using a plurality of resources;
wherein the cellular base station is further configured to determine to activate or deactivate multiple periodic reference signals on multiple resources;
wherein the second configuration information indicates that the multiple periodic reference signals are deactivated on the multiple resources.

19. The cellular base station of claim 15,
wherein the second configuration information updates a periodicity of the periodic reference signal on the at least one resource to activate or deactivate the periodic reference signal on the at least one resource.

20. The cellular base station of claim 15, wherein the cellular base station is further configured to:
perform a non reference signal transmission using one or more deactivated periodic reference signal resources.

* * * * *